Figure 1:
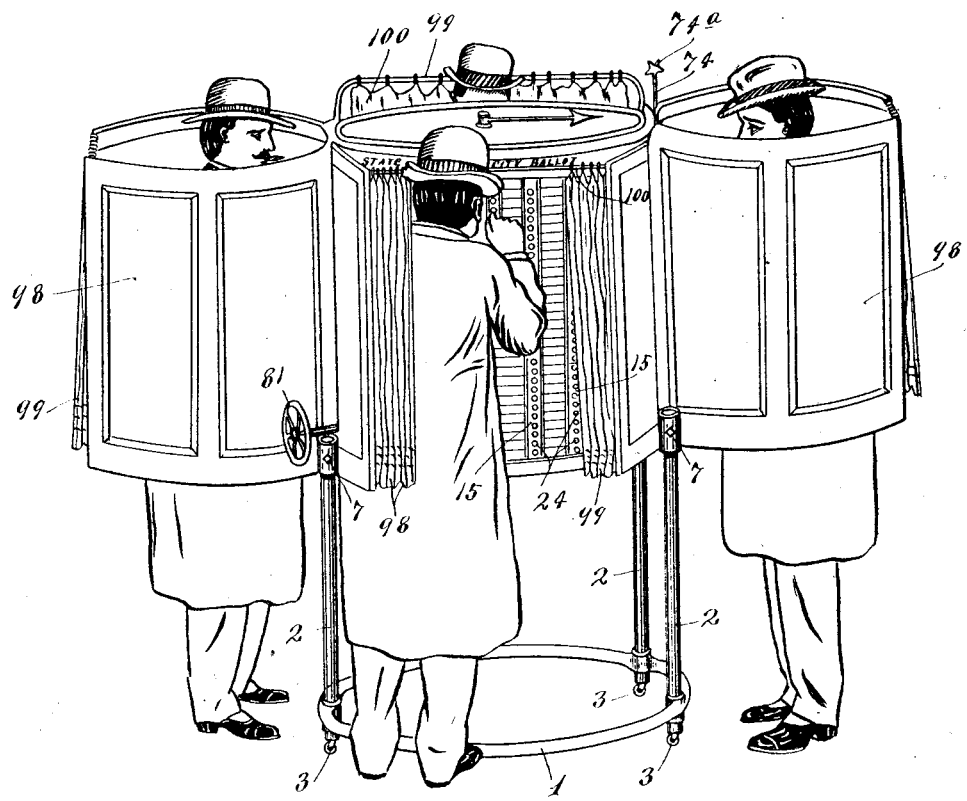

S. LOE.
MULTIPLEX VOTING MACHINE.
APPLICATION FILED DEC. 7, 1908.

1,039,419.

Patented Sept. 24, 1912.
13 SHEETS—SHEET 1.

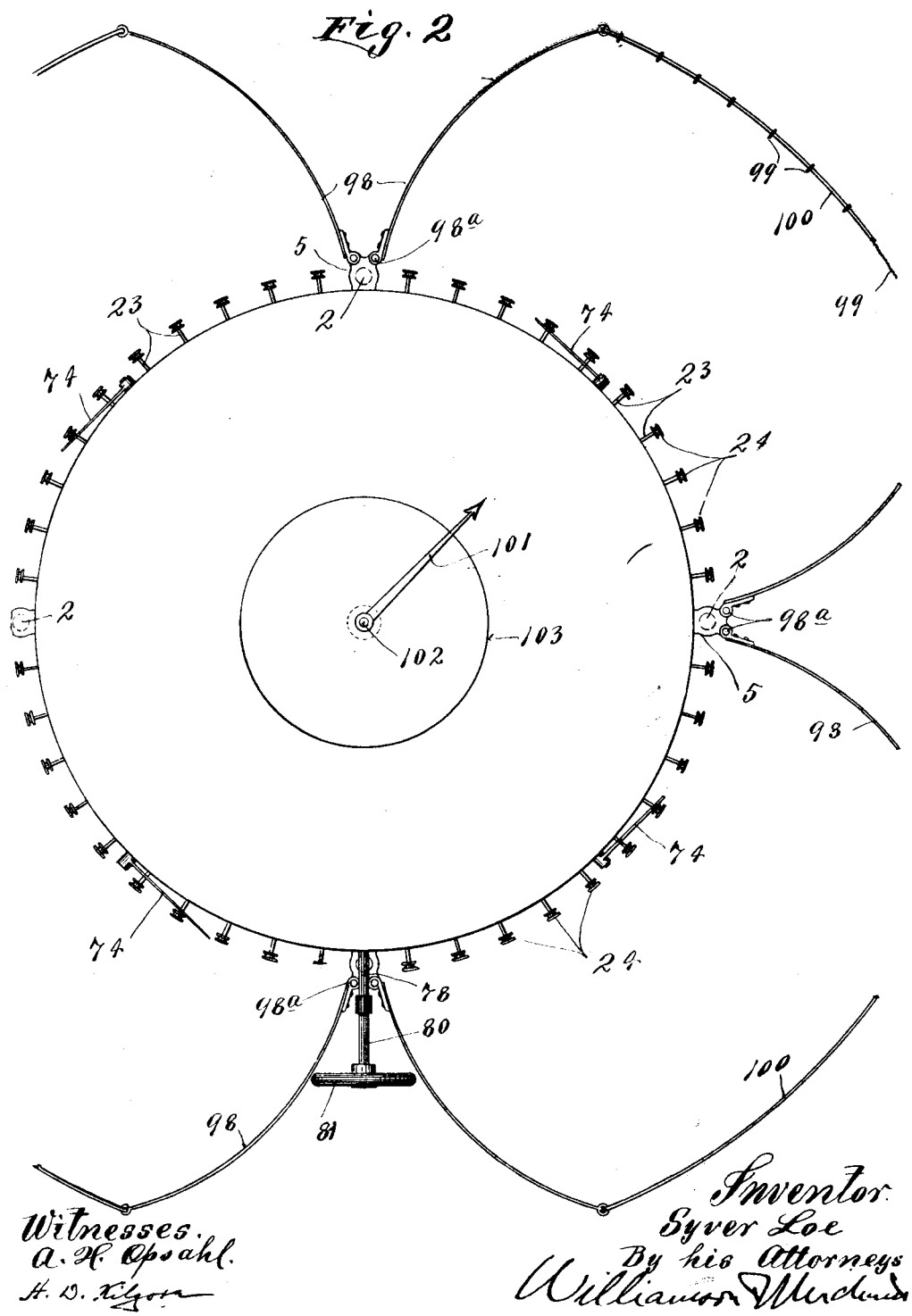

S. LOE.
MULTIPLEX VOTING MACHINE.
APPLICATION FILED DEC. 7, 1908.
1,039,419.
Patented Sept. 24, 1912.
13 SHEETS—SHEET 3.
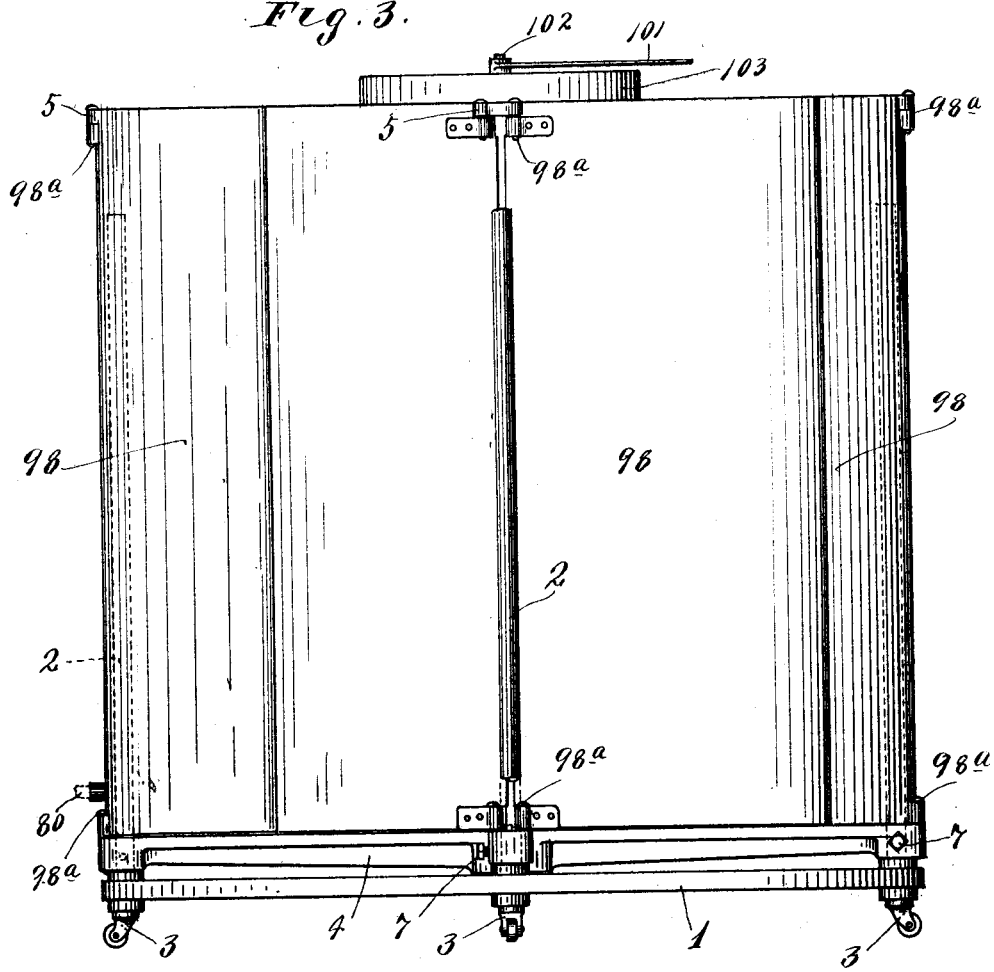
Witnesses.
A. H. Opsahl.
H. O. Kilgore
Inventor.
Syver Loe.
By his Attorneys
Williamson Merchant

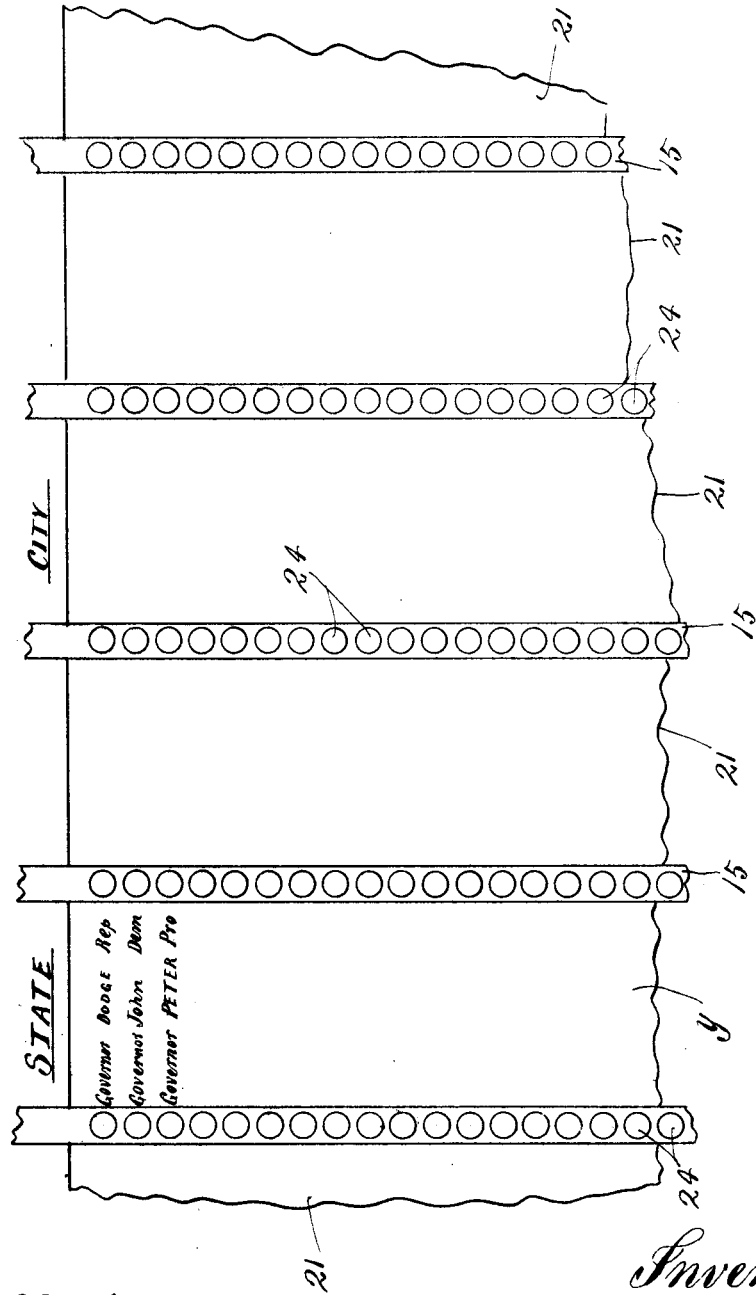

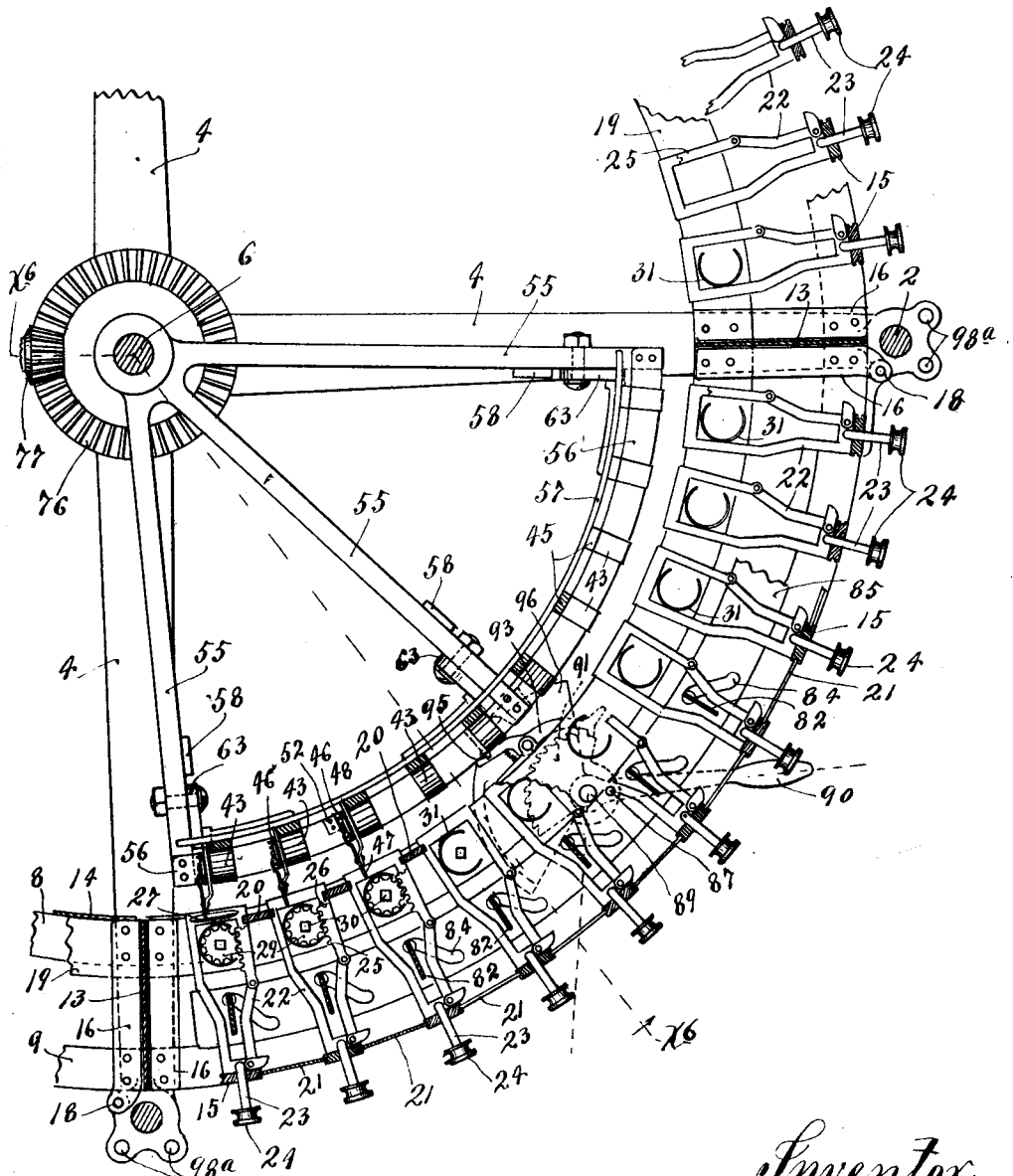

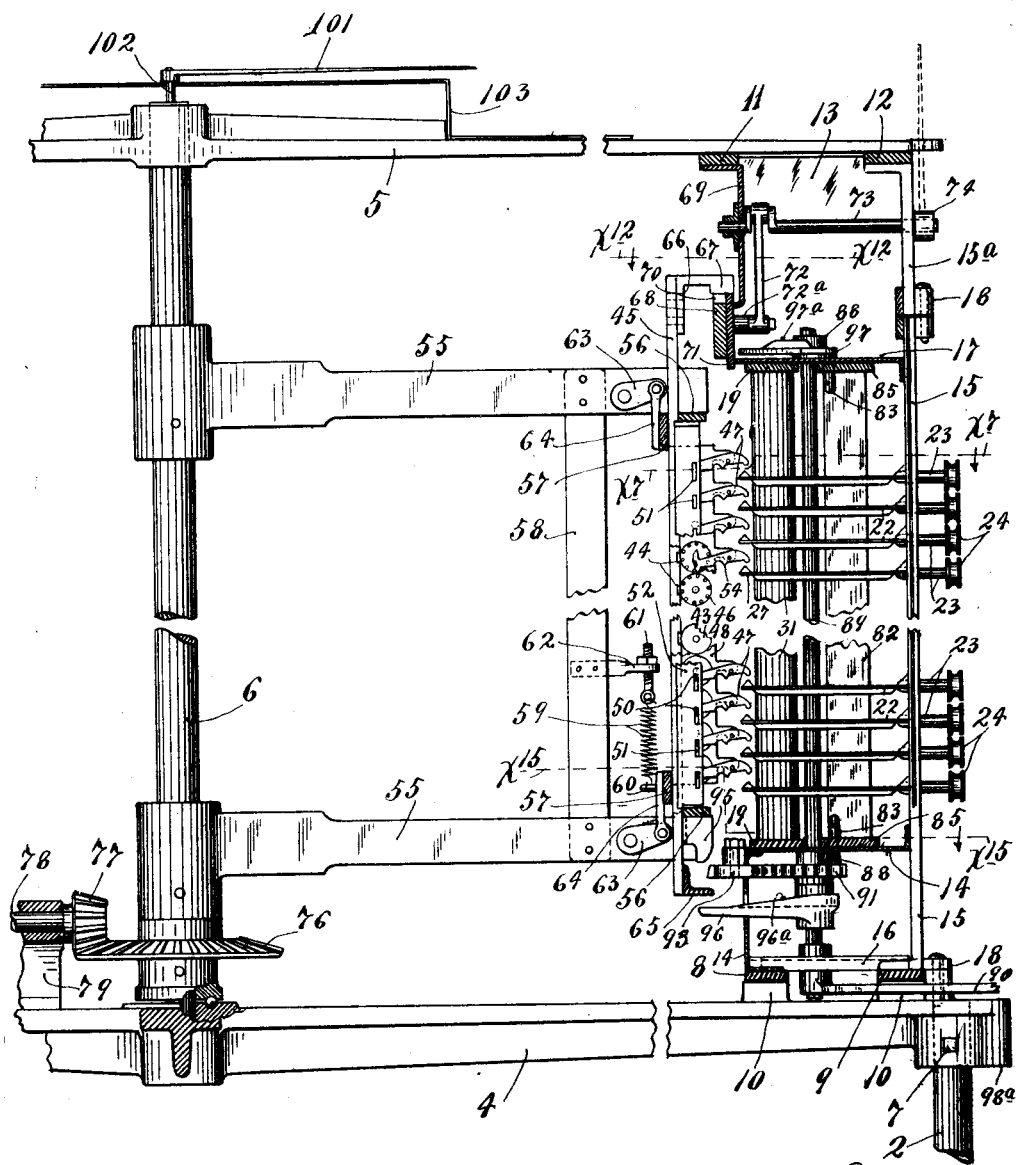

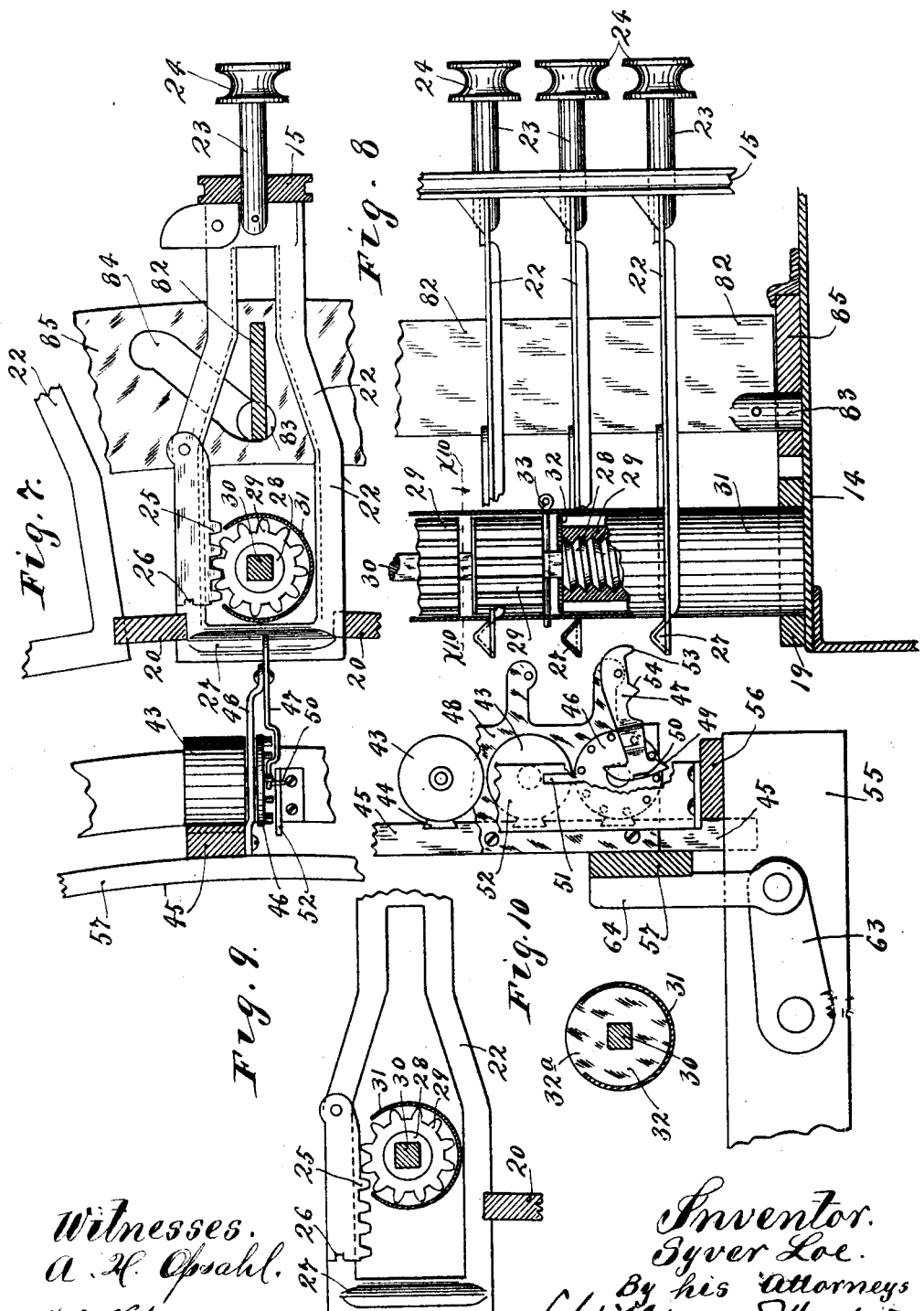

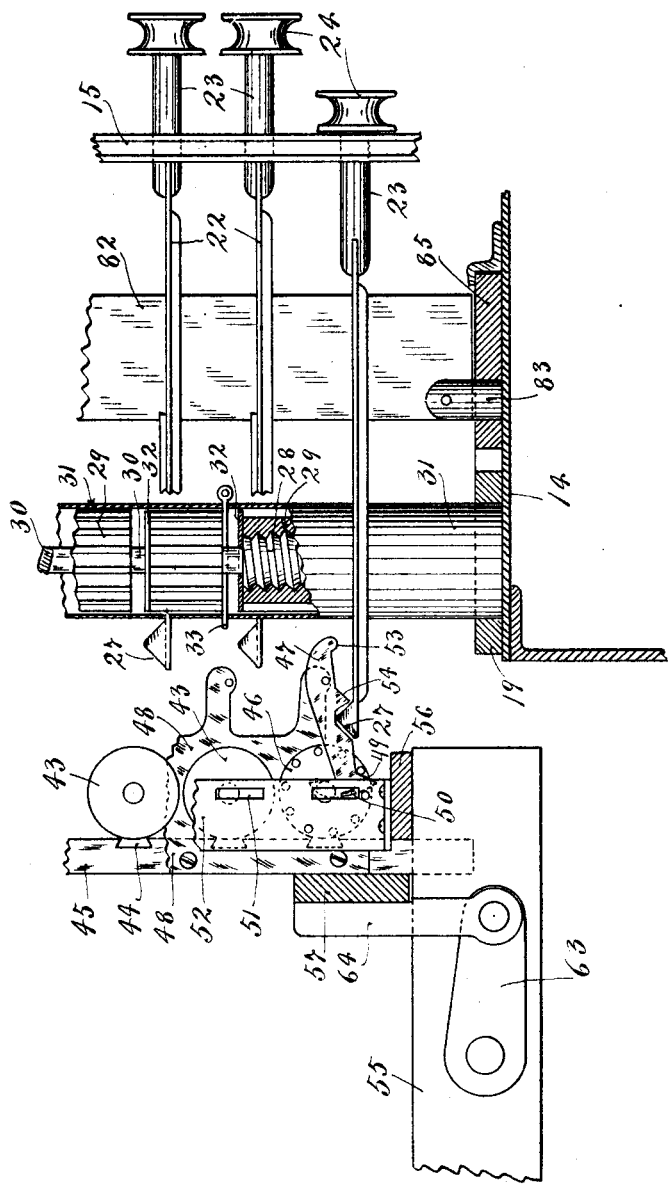

S. LOE.
MULTIPLEX VOTING MACHINE.
APPLICATION FILED DEC. 7, 1908.
1,039,419.
Patented Sept. 24, 1912.
13 SHEETS—SHEET 9.
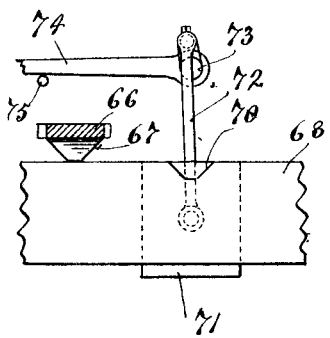
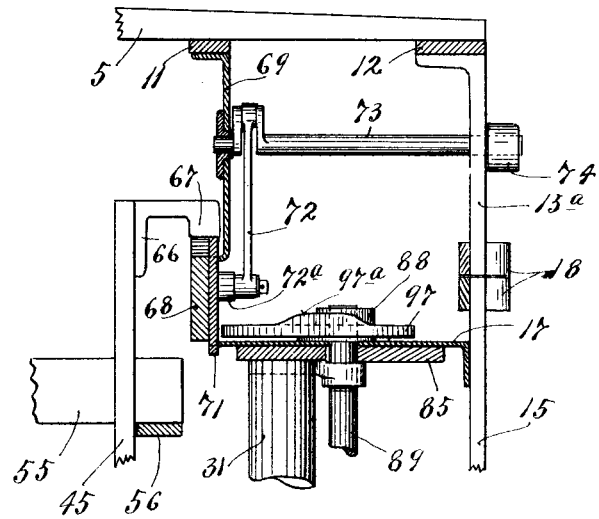
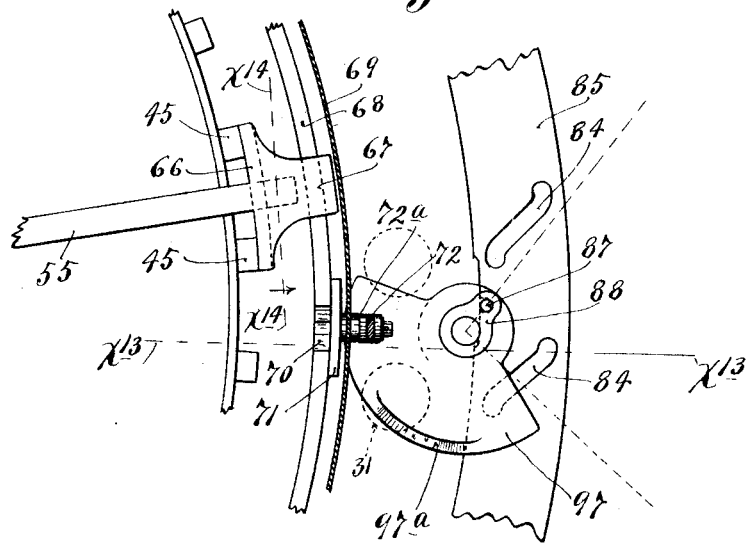
Witnesses
A. H. Opsahl
H. D. Kleyn
Inventor
Syver Loe.
By his Attorneys
Williamson Merchant

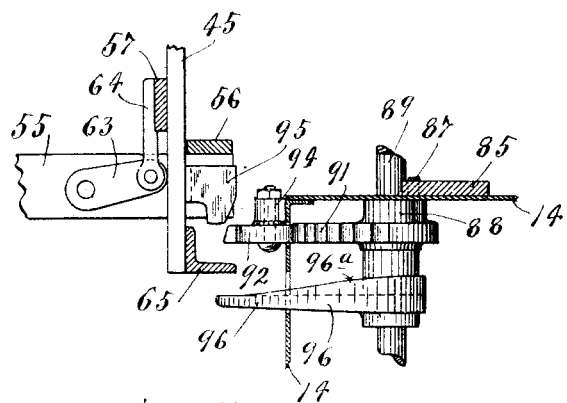
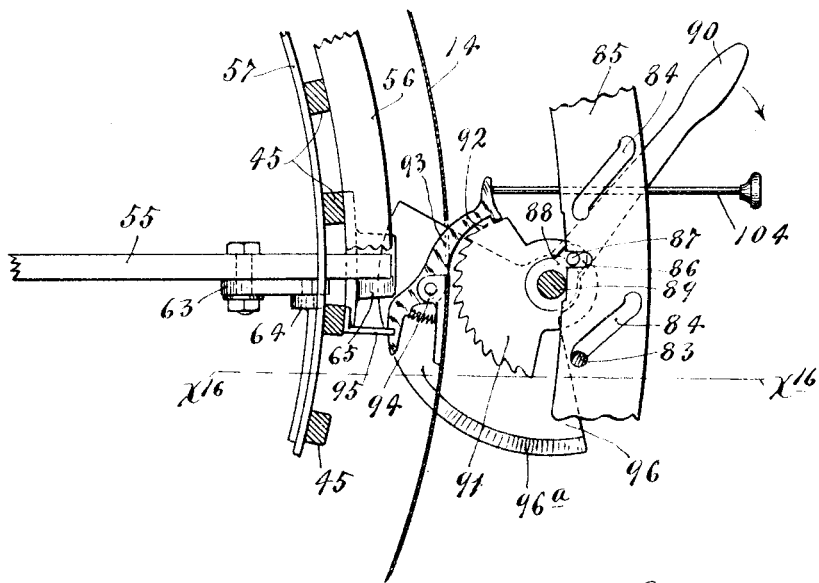

S. LOE.
MULTIPLEX VOTING MACHINE.
APPLICATION FILED DEC. 7, 1908.
1,039,419.
Patented Sept. 24, 1912.
13 SHEETS—SHEET 11.
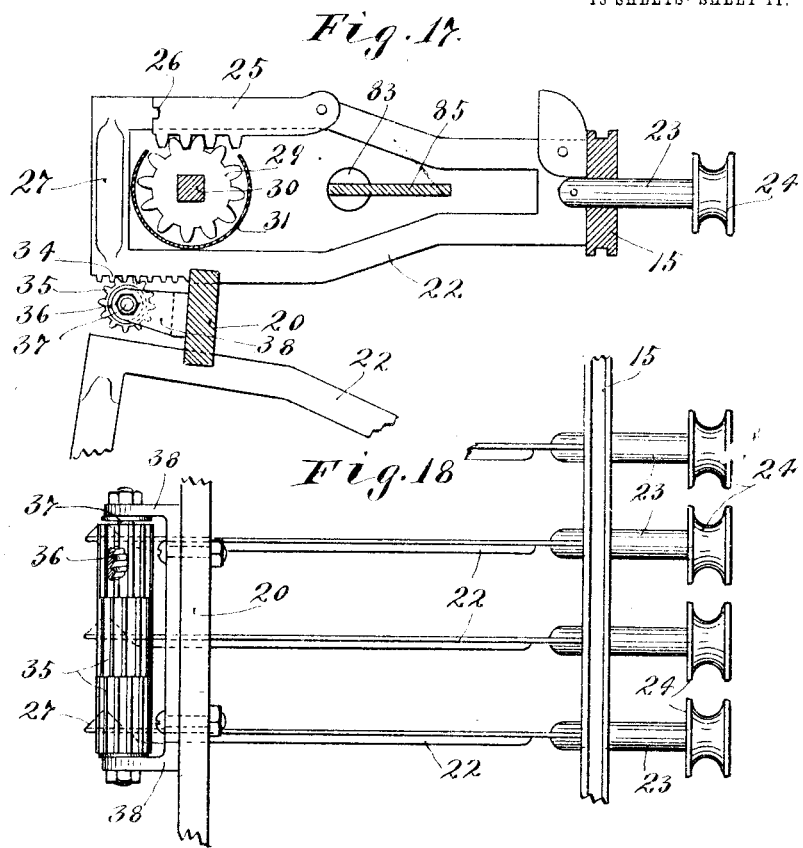
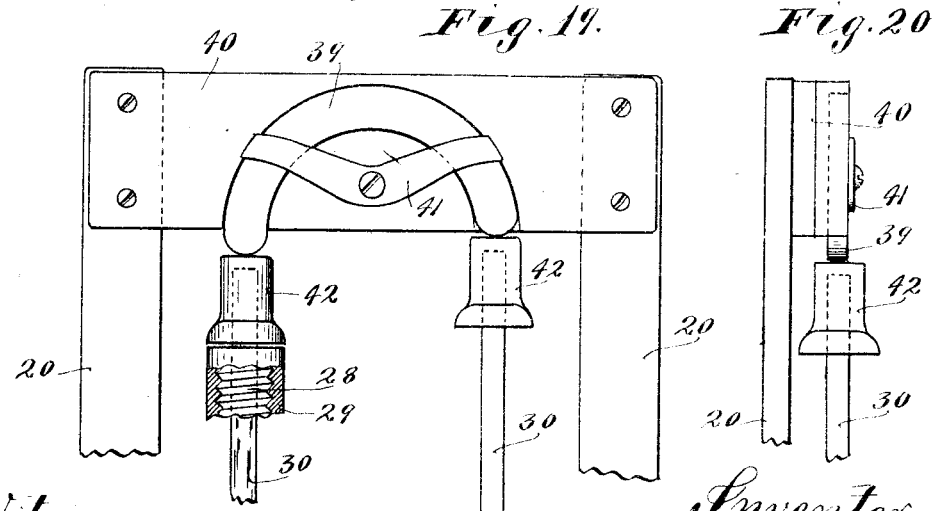
Witnesses
A. H. Opsahl.
H. D. Kilgore.
Inventor.
Syver Loe
By his Attorneys
Williamson Merchant S. LOE.
MULTIPLEX VOTING MACHINE.
APPLICATION FILED DEC. 7, 1908.
1,039,419.
Patented Sept. 24, 1912.
13 SHEETS—SHEET 12.
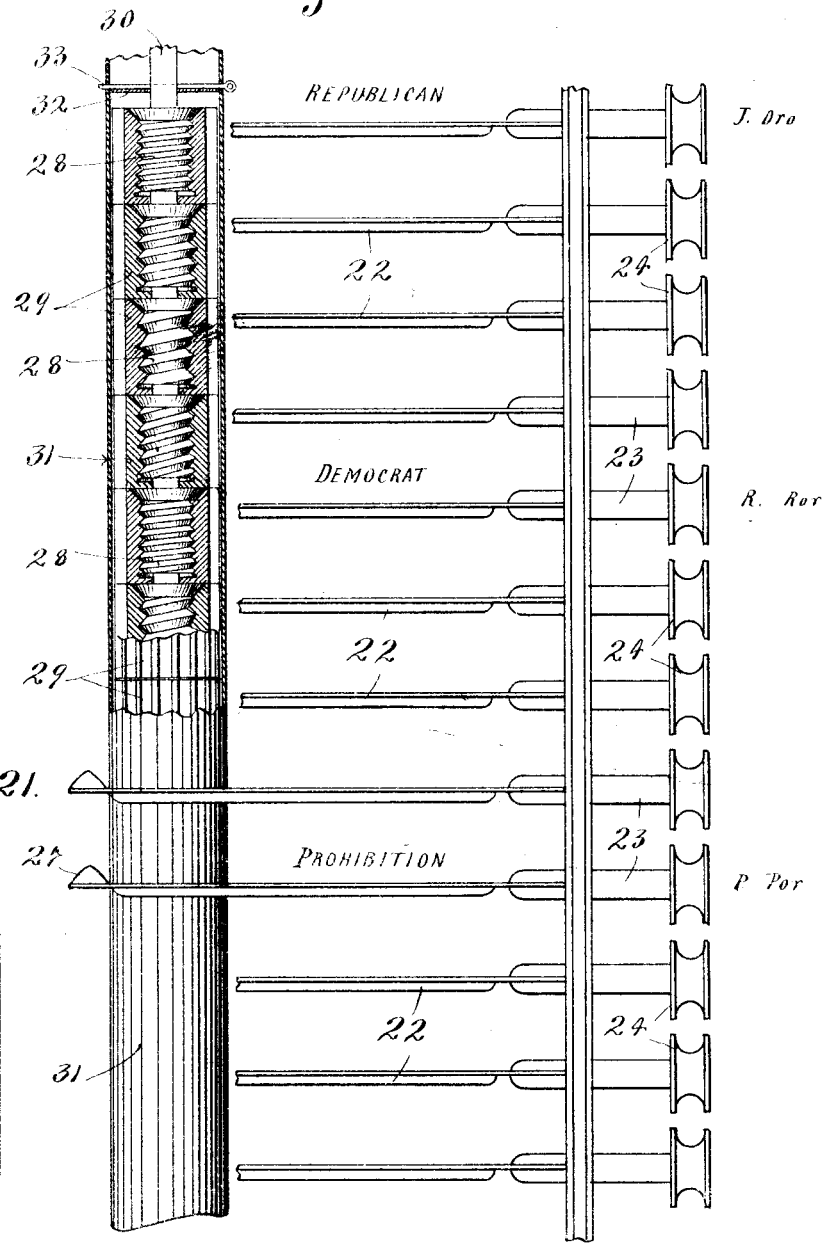
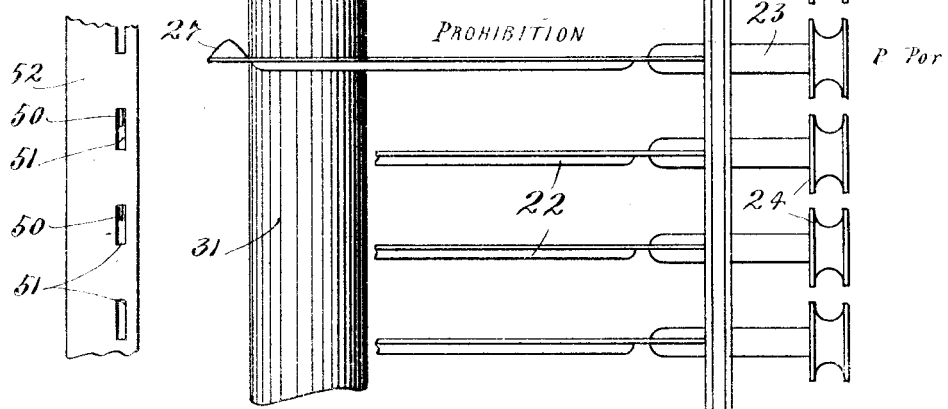

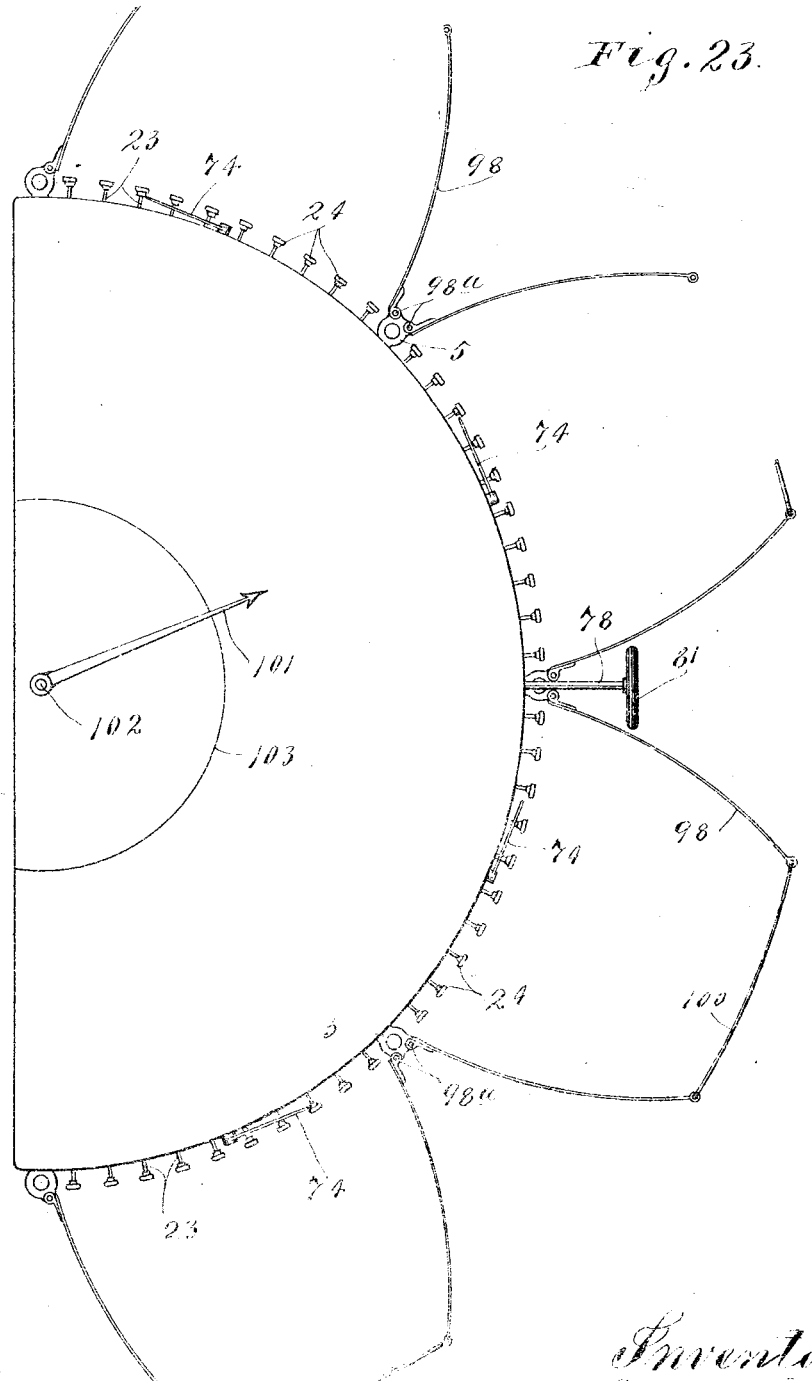

UNITED STATES PATENT OFFICE.

SYVER LOE, OF MINNEAPOLIS, MINNESOTA, ASSIGNOR OF TWO-THIRDS TO JESSE W. WALKER, OF PITTSBURGH, PENNSYLVANIA.

MULTIPLEX VOTING-MACHINE.

1,039,419.  Specification of Letters Patent.  Patented Sept. 24, 1912.

Application filed December 7, 1908. Serial No. 466,312.

*To all whom it may concern:*

Be it known that I, SYVER LOE, a citizen of the United States, residing at Minneapolis, in the county of Hennepin and State of Minnesota, have invented certain new and useful Improvements in Multiplex Voting-Machines; and I do hereby declare the following to be a full, clear, and exact description of the invention, such as will enable others skilled in the art to which it appertains to make and use the same.

My invention relates particularly to multiplex voting machines, and has for its object to improve the same with a view of securing increased vote registering capacity, with a minimum of mechanism and at a minimum of cost.

To the above ends, the invention consists of the novel devices and combinations of devices hereinafter described and defined in the claims.

Actual experience with voting machines at elections, has demonstrated the fact, that a single voting machine has not sufficient vote registering capacity to enable voters at a precinct of the ordinary size, to register all their votes within the limits of time customarily allowed. For example, about three minutes, on an average, is required for the voters to register their votes at a general election, and the polls are customarily kept open for voting for a period of thirteen hours. The average precinct has about 350 voters, and many precincts having 500 and even more voters. To register even 350 votes, at the average rate above stated, will consume approximately seventeen and one-half hours or more than four and one-half hours more than the time allowed for doing so.
The registers and frame work are the expensive parts of all voting machines.

In my prior Patent 994,763 dated June 13, 1911, I disclose and claim a multiplex voting machine, comprising several independent sets or series of register actuators arranged to coöperate with a common set of registers, and which actuators were so arranged that they could be moved from normal positions into set positions, and restored to normal positions without action on the said registers. Also, restoring devices were provided for the independent sets of register actuators, in connection with means for rendering the set registers operative on their respective registers.

In the machine of my present application, I employ a common set of registers in connection with several independent sets of register actuators, and provide means whereby the common set of registers may be moved into position for co-action with any one of the said several independent sets of register actuators. Preferably these register actuators are in the form of sliding keys, and each set thereof, involves a multiplicity of these so called keys, alined in vertical columns and horizontal rows. The traveling support for the common set of registers is preferably arranged both for horizontal and vertical movements, the first noted movement serving to move the registers, approximately into coöperative relation in respect to the particular set of register actuators or keys, and the latter movement serving to completely or finally position the said registers, so that they will be subject to the coöperating register actuators or keys. The arrangement is such, however, that normally, the register actuators or keys may be moved individually into set positions and again back into normal positions, without action on any register, and for each set of register actuators a restoring mechanism is provided.

In the accompanying drawings which illustrate the improved machine, like characters indicate like parts throughout the several views.

Referring to these drawings: Figure 1 is a perspective view showing the machine in use; Fig. 2 is a diagrammatic plan view of the machine, some parts being broken away; Fig. 3 is a side elevation, with some parts broken away, showing the machine closed up and let down into its framework so that it is in condition for storage or shipment; Fig. 4 is a diagrammatic view in elevation, with parts broken away, illustrating an arrangement of the register actuators or keys for voting mixed tickets; Fig. 5 is a view partly in diagrammatic plan view and partly in horizontal section, showing the arrangement of the several sets of register actuators or keys and the common set of registers and showing also the supports therefor, some parts being broken away and some parts being removed; Fig. 6 is a vertical section taken approximately on the line $x^a$ $x^b$ of Fig. 5, some parts being left in full; Fig. 7 is an enlarged horizontal section taken approximately on the line $x^7$ $x^7$ of Fig. 6; Fig. 8 is an enlarged vertical section taken on the same line as Fig. 6, showing approximately the same parts that are shown in Fig. 7, some parts being broken away; Fig. 9 is a detail in horizontal section on the same line as Fig. 7, showing one of the register actuators or keys moved into a set position; Fig. 10 is a detail in section on the line $x^{10}$ $x^{10}$ of Fig. 8; Fig. 11 is a view corresponding to Fig. 8, but showing the register actuators or keys in set positions and the registers in position to be actuated by return movements thereof; Fig. 12 is a horizontal section taken on the line $x^{12}$ $x^{12}$ of Fig. 6; Fig. 13 is a vertical section taken on the line $x^{13}$ $x^{13}$ of Fig. 12, some parts being broken away; Fig. 14 is a vertical section taken on the line $x^{14}$ $x^{14}$ of Fig. 12; Fig. 15 is a detail in horizontal section taken on the irregular line $x^{15}$ $x^{15}$ on Fig. 6; Fig. 16 is a vertical section taken on the line $x^{16}$ $x^{16}$ of Fig. 15, some parts being left in full; Fig. 17 is a fragmentary view partly in plan, and partly in horizontal section, showing a supplemental vote limiting device for connection to keys where several keys are appropriated to a candidate appearing as the candidate of several different political parties for the same office; Fig. 18 is a side elevation of the parts shown in Fig. 17; Fig. 19 is a front elevation, showing an attachment for the vote limiting mechanism, whereby two columns of vote limiting devices may be connected and made to operate as a single group; Fig. 20 is a side elevation of the parts shown in Fig. 19; Fig. 21 is a front elevation showing in detail a register locking strip; Fig. 22 is a detail view partly in section, and partly in elevation, showing register actuating keys and coöperating vote limiting mechanism arranged for so called fractional voting; and Fig. 23 is a diagrammatic plan view, showing a slightly modified arrangement of the several sets of register actuators or keys.

In the machine illustrated in the drawings, the register actuators are assembled in four sets and are radially extended in and project outward from a cylindrical support, so that four parties at the same machine may simultaneously set register actuators or keys to represent the votes that they wish to cast. The common set of registers, in this preferred arrangement, are assembled within the quadrant of an imaginary cylinder, and are located inside of the cylindrical band of register actuators, and are arranged to be moved into positions which will subject the proper registers to the actions of the set of register actuators or keys. Also in the machine illustrated, the register actuators or keys in vertical columns are arranged for the voting of so called mixed tickets; that is, tickets on which the candidates of the different political parties are grouped together.

*Machine case and supports.*—The construction of the machine illustrated in the drawings, described in detail, is as follows: The pedestal or rack which supports the case of the machine is shown as made up of a base ring 1, having four upright rods 2 rigidly secured thereto at their lower ends. Also as shown, the base ring 1 is supported on casters 3. The case of the machine, in which the mechanism of the machine is mounted, has a four-armed base bracket 4, and a four-armed top bracket 5, the arms of both of which brackets radiate from centrally located hubs in which the ends of an upright shaft 6 are journaled. The arms of the base bracket 4 are arranged to slide vertically upon the rods 2 of the supporting pedestal and to be rigidly secured thereto by set screws 7. Concentric metal rings 8 and 9 are rigidly secured to raised bosses 10 on the arms of the said base bracket 4, and another pair of concentric rings 11 and 12 are rigidly secured to the arms of the top bracket 5. The arms of the upper and lower brackets 4 and 5, at their outer ends, are rigidly tied together by upright metal column plates 13, shown in Figs. 5 and 6, which column plates at their upper ends, are directly secured to the arms of said brackets 5, and at their lower ends are directly secured to the rings 8 and 9.

The machine illustrated is designed for simultaneous use by four persons, and hence, there are four sets of register actuators or keys for coöperation with the common set of registers. That ready access may be had to the registers, and to the register actuators, each set of register actuators or keys is mounted on and carried by a movable segmental support that constitutes part of the framework of the machine case. As shown, these independent key supports are hinged at one extremity, for swinging movements in a horizontal plane, and each is constructed as follows: The numeral 14, (see Figs. 5 and 6), indicates a segmental channel plate, the lower flange of which rests loosely on the lower ring 8, and the out-turned upper flange of which is riveted or otherwise rigidly secured to a plurality of vertically extended circumferentially spaced ticket supporting bars 15, having grooved edges. The flanged lower ends of these bars 15 rest loosely upon the lower ring 9, and the end members thereof are rigidly connected to the lower flange of the said channel plate 14, by short tie bars 16. The outer flange of a segmental horizontally disposed bearing plate 17 is riveted or otherwise rigidly secured to the upright bars 15, by rivets or by other means. The several bars 15 aline with shorter bars 15ª, the upper ends of which are rigidly secured to the upper ring 12, which latter it will be remembered, is rigidly secured to the arms of the upper bracket 5. The said parts 14, 15, 16 and 17, it will thus be seen, constitute the segmental supporting frame for a set of register actuator keys.

One of the extreme end bars 15 of each of the segmental actuator or key supporting frames above described, is connected by hinges 18, see particularly Figs. 5 and 6, to one of the arms of the lower bracket 4, and to the immediately overlying fixed bar 15ª. This permits each segmental key supporting frame to be swung outward on its hinges, into a position in which the innermost portion thereof will be exposed to view. Such pivotal movement is indicated in part by dotted lines, on Fig. 5. To the top of the horizontal portion of the lower bearing plates 14, and to the bottom of the top bearing plates 17, segmental bars 19 are rigidly secured, and these two segmental bars of each of the several hinged frames are rigidly connected to the ends of circumferentially spaced upright guide bars 20, best shown in Figs. 5 and 6.

Thin metal ticket holding strips 21 are slid into the grooved edges of the bars 15 and the printed tickets, in the form of paper strips Y. see Fig. 4, are adapted to be placed against the outer faces of said metal strips 21, and to be thereby held in a like manner, by the said grooved bars 15.

*Register actuating keys.*—The register actuators or keys, which as before stated are arranged in vertical columns and in horizontal rows, have bifurcated body portions 22 and stems 23, which latter terminate in heads 24. The said stems 23 are mounted to move through perforations in the upright bars 15, and the body portions 22, at their edges, work in grooves cut in the edges of the upright bars 20, so that the said keys are mounted for radial movements toward and from the axis of the shaft 6, see particularly Figs. 5, 6, 7 and 8. Each key body 22 at its side, has a rack 25, that is pivotally connected thereto at one end and has interlocking engagement therewith at its free end by means of a notch and lug connection. Said racks 25 are preferably of spring steel so that their free ends may be sprung out of engagement at 26, and hence move pivotally into inoperative positions, for a purpose which will hereinafter appear. The transversely extended inner end portion of the key bodies 22, see particularly Figs. 7, 8, and 9, are formed with reversely beveled cam surfaces 27. By reference to Fig. 9, it will be seen that when a key is moved into its set position, the teeth of the rack 25 are moved out of mesh with the teeth of the coöperating pinion 29, so that the final inward movement of the key does not move the said pinion.

*Vote limiting mechanism.*—This mechanism, except for certain improvements, is of the type disclosed and broadly claimed in my prior Patent, 712,079, of date October 28, 1902, entitled Voting machine, and hence, in this case is illustrated only in part. For each vertical column of keys, there is a vertical column of laterally expansible devices made up of threaded hubs 28 and nut members 29. The so-called hubs 28 of each stack are axially alined and are mounted to slide axially upon a fixed or non-rotary shaft 30, preferably made square in cross section. As shown, said shafts 30 extend through the openings in the corresponding column of key bodies 22 and are fixed at their ends to the upper bearing plates 17 and to the horizontal portions of the channel plates 14. There is one hub 28 and one nut member 29 for each key; and the said nut members, which as shown, are in the form of gears and have wide faces, mesh one with each of the key racks 25. Each column of gears 29 is located inside of a tubular casing 31, secured at its upper and lower ends respectively to the bearing plates 17 and 14, and having open sides which permit the racks 25 to engage with the respective gears. At suitable intervals, at points between the gears, each shaft 30 is held against twisting movement or torsional spring, by disks, 32, (see Figs. 8 and 10), which disks have square perforations engaging the said shafts, and are provided with outwardly offset segmental portions 32ª that engage the side openings in the respective tubular casing 31. These disks 32 are therefore free for sliding movements in respect to the shaft 30 and casing 31.

By means of suitable stop devices, such for instance, as pins 33, (see Fig. 8), passed through the casing 31 and through the non-rotary shaft 30, between certain of the gears or nut members 29, the said gears and their coöperating hubs may be separated into groups of the desired number, having the desired total play or clearance between the members of the lateral expansible elements. For instance, with the machine arranged for the voting of mixed tickets, as above stated, and with the first three columns of keys at the left in respect to Figs. 1, 4 and 5, assigned to the State ballot, the next three columns to the right assigned to the county ballot, the next three columns to the right assigned to the city ballot, and the last column at the right assigned to constitutional amendments, and other matters that should be voted yes or no, the grouping and adjustments of the expansible hub and gear elements should be as follows: For instance, the group assigned to office of governor should correspond to the number of parties represented, thus, there being for instance, Republican, Democratic and Prohibition candidates for governor, three laterally expansible vote limiting devices 28—29 should be confined between two stop pins 33 or other suitable stop devices, and there should be normally an amount of clearance or play between the said devices sufficient, and only sufficient, to permit an inward movement of one register actuating key and resulting movement of the corresponding gear 29. Hence, when one of the said three keys appropriated to governor is pushed inward to its set position, the corresponding gear 29 will be rotated on its coöperating hub 28, and the two parts expanding laterally, will take up the entire play between the elements of that group, and thereby prevent the inward movement to set position of any other key of that group. In some groups where several candidates may properly be elected to the same office, such for instance, as judges of the district court, members of school boards and park commissioners, the amount of normal clearance between the elements of the group should be just sufficient to permit the inward movement to set positions of the proper number of keys and the resulting expanding movement of the corresponding vote limiting devices 28—29.

In some States so called fractional voting is permissible. For instance, in the State of Illinois, in the election of assemblymen, each political party may nominate either one, two or three candidates, and voters are entitled to vote as follows: One vote for each of three candidates, one and one-half votes for each two candidates, two votes for one candidate, and one vote for another candidate, or three votes for one candidate. My improved vote limiting mechanism, to-wit, the vote limiting mechanism disclosed and broadly claimed in my prior Patent 712,079, is capable of being arranged to take care of this kind of fractional voting. For instance, by providing four keys and four vote limiting devices 28—29 for each candidate, and providing differential threads in each of the four coöperating expansible devices 28—29, the problem is met. More particularly stated, (see Fig. 22), of the four hubs 28 provided for the same candidate, if the one representing one vote is provided with twelve threads to the inch, the hub representing one and one-half votes should have eight threads, the hub representing two votes should have six threads, and the hub representing three votes should have four threads. Four threads to the inch on the latter noted hub would probably require double threads, to reduce the size of the threads. If each of three political parties should nominate only one candidate, twelve keys and twelve coöperating vote limiting devices 28—29 would be required in a single group, and the normal amount of play between the said devices 28—29, should be just sufficient to permit three full votes to be cast. If however, each of three political parties should nominate three candidates, thirty-six keys and an equal number of limiting devices 28—29, in the same group, would be required, and in this instance, as well as in others, the normal play between the vote limiting devices 28—29 should be just sufficient to permit the movement to set positions, of a combination of keys representing in the aggregate three full votes. It seldom happens however, that all of the political parties will nominate the maximum of three candidates for the same office, and hence in practice, the number of keys and the number of vote limiting devices 28—29 in the group, will be much less than the maximum number assumed. In adjusting the machine for this fractional voting, the usual keys provided for other purposes will be used, but the vote limiting devices 28—29 having differential threads, must be properly substituted for those used for ordinary voting.

It sometimes happens that the same person will be represented as candidate of several political parties for the same office, and hence I provide a supplemental vote limiting device or attachment, which, when any one of the several different keys assigned to such candidate has been set, the other keys of the other political party or parties assigned to the same candidate will be locked in normal positions, or held so that they cannot be set. This supplemental vote limiting device is illustrated in Figs. 17 and 18. In this arrangement, the keys which operate in the manner already described, through vote limiting devices 28—29, and which operate on registers in a manner hereinafter described, are provided with rack teeth 34 preferably formed on one edge of the body portions 22, and these engage with wide faced pinions 35. The pinions 35, like the gears 29, engage screw threaded hubs 36, which in turn are mounted to slide on an angular shaft 37, shown as secured at its ends to a prong bracket 38 bolted to one of the inner guide bars 20. In this arrangement, there should be just sufficient play between the expansible devices 35—36 and the prongs of the brackets 38 to permit one of the several keys (as shown three), to be moved into a set position. Hence, if one person appears as the candidate for two political parties, where three or more political parties have candidates for the same office, the vote limiting devices 28—29 will limit the number of party votes which may be registered for that particular office, and supplemental vote limiting devices 35—36 will prevent more than one vote being cast for the same person, even though this person be represented as candidate for more than one party. This supplemental vote limiting device will be especially required in instances where more than one party may be elected to the same office and where one of the candidates is the common candidate of more than one of the political parties represented.

Frequently at primary elections and sometimes at general elections, there will be such a large number of candidates that more than one complete column of keys and vote limiting devices are required to represent the candidates for a single office. To take care of this condition, I provide means for connecting all or a part of the vote limiting devices of one column with all or a part of the vote limiting devices of another column, so that they may be used as a single group having a predetermined definite total amount of expansibility. One form of this device is illustrated in Figs. 19 and 20, wherein the numeral 39 indicates a segmental push bar shown as seated in the tie-plate 40, secured to the upper end of two adjacent bars 20. A screw held clip 41, as shown, holds the push bar 39 in a segmental seat formed in the tie-plate 40. The ends of the segmental push bar 39 engage with the upper ends of hubs 42, that are telescoped onto the upper ends of two adjacent non-rotary shafts 30. The said hubs 42 are arranged to be engaged by the upper ends of the upper members of threaded hubs 28. With this arrangement, as is evident, expanding movements of the devices 28—29 in one column, will be transmitted to corresponding members in an adjacent column.

*Registers and support for same.*—The registers or tallies, which as before stated, are arranged in several vertical columns, may be of standard or any suitable construction, and as shown, the so called escapement mechanism for directly actuating the same, is of the character disclosed and claimed in my prior Patent 804,962, of date November 21, 1905, entitled Voting machine. These registers are indicated as entireties by the numeral 43, and are shown as provided with dovetailed projections 44 that fit dovetail seats of vertical supporting bars 45, see particularly Figs. 5, 6, 8 and 11. The unit member of each register is connected to move with a pin wheel 46, that is provided with ten laterally projecting cam pins. For coöperation with each escape of the wheel 46, there is provided a so called escapement lever 47, that is pivoted to a supporting plate 48, which in turn is secured to the corresponding register supporting bar 45. At their inner ends, the levers 47 are formed with reversely projecting and reversely beveled cam lugs 49 that act upon the pins of the coöperating escapement wheel 46 in a manner to be presently described. Also at their inner ends, the levers 47 are provided with laterally projecting lugs 50 that work in slots 51, (see Figs. 6, 11 and 31), of a register locking bar or strip 52 that is rigidly secured to parts presently to be described. Outward of their pivots, the escapement levers 47 are provided with cam lugs 53, and inward of their pivots, they are provided with cam lugs 54 that are adapted to be engaged by the cam bar or surface 27 of the coöperating key body 22, as will hereafter more fully appear.

The number of register supporting bars 45, as well as the number of registers on each bar, may, of course, be varied, but as shown, there are ten of these bars 45. The total number of registers, should however, correspond to the number of keys or register actuators in any one of the several sets, and as shown they are mounted to move vertically in a skeleton segmental main support, as shown, made up of upper and lower three-armed brackets 55 and segmental tie bars 56. The hubs of the brackets 55 are rigidly secured to the shaft 6, and the segmental tie bars 56 rigidly connect the free ends of the arms of said brackets. The register supporting bars 45 are rigidly tied together for common vertical movement, as shown, by means of a pair of vertically spaced horizontally extended segmental tie bars 57. Also as shown, the vertically alined arms of the upper and lower brackets 55 are further rigidly connected by vertical tie bars 58. The upper and lower ends of the notched register locking bars 52, above described, are rigidly secured to the upper and lower segmental tie bars 56, see Figs. 6 and 11.

From the above, it will be seen that the registers are directly mounted on a vertically movable supplemental support that is carried by an oscillatory main support. The weight of this supplemental support and of the registers and their escapements, is in part sustained by a yielding connection between the said main and supplemental support. This yielding connection is preferably afforded by one or more coiled springs 59, see Fig. 6, wherein the said spring is shown as attached at its lower end to a pin 60 projecting from the lower segmental tie bar 57, and at its upper end is adjustably connected by a nut and bolt 61 to a lug 62 secured to one of the upright tie bars 58 of the main register carrying frame. As shown, the supplemental register support made up of the bars 45 and 57, is connected to the main support, made up of the brackets 55 and bars 56 and 58, by means of short crank arms 63 pivotally connected to the arms of said brackets 55 and to short arms 64 rigidly secured to the upper and lower segmental tie bars 57 of the said supplemental support. The said cranks 63 support the said supplemental support with freedom for slight vertical movements.

The two central members of the bars 45, see Figs. 6, 12, 13 and 15, are longer than the other members, being extended both upward and downward. Their lower ends are connected by a so called cam bar 65, shown as of angular form, and their upper ends are rigidly connected by tie bracket 66, which is extended outward and provided with a supporting shoe in the form of a reversely beveled centering head 67 best shown in Figs. 6, 13 and 14. This head 67 rides upon an endless horizontally extended register supporting rail or track 68, that is rigidly secured to the lower edge of an endless channel plate 69, the upper edge of which, as shown, is rigidly secured to the main frame ring 11, which it will be remembered, is rigidly secured to the arms of the upper frame bracket 5. The machine illustrated, being a four sectioned or part machine, that is, being provided with four sets of register actuators, the rail 68 is provided at four equi-distant points in its upper edge with reversely beveled centering notches 70 that are located for proper coöperation with the centering head 67 to position the registers for proper coöperation with any one of the four sets of keys or register actuators. Also these notches 70 permit the supplemental registering support, the registers and the register escapement dogs to be lowered slightly when they have been moved by horizontal oscillatory movement into alinement with the respective register actuating keys.

Normally, the notches 70 are closed, or in other words, the track is made continuous, by so called rail plates or supplemental rail sections 71, which as shown, are guided for vertical movements on the outer face of the rail 68, being as shown, arranged to work through notches in the bearing plates 17 and in the channel plates 69. Each rail plate 71 is connected by a crank rod 72, see particularly Figs. 6, 12, 13 and 14, to a radially extended crank shaft 73, journaled in the channel plate 69 and in one of the bars 15ª. At their outer ends, the crank shafts 73 are provided with operating arms 74, the positions of which serve to indicate whether the rail plates 71 are raised or lowered. For instance, when the said rail plates are raised, the arms 74 will be turned into a horizontal position against a fixed stop 75 on one of the bars 15ª, and the crank of the shaft 73 and the rod 72 will be thrown slightly to one side of a dead center, as shown in Fig. 14, and in this way, the rail plate will be locked in its raised or operative position so that the centering head 67 may be freely moved over the notch 70.

On the lower end of the shaft 6 is a spur gear 76 that meshes with the beveled pinion 77, secured to the inner end of a shaft 78. The shaft 78 is mounted in suitable bearings 79, see Fig. 6, on the lower bracket 4 and is provided with a detachable section 80 having a hand wheel 81. By rotation of the hand wheel 81 and the shaft 78, the upright shaft 6 and the register carrying frame may be oscillated or rotated, so as to bring the common set of registers in front of any one of the several sets of register actuating keys, in which position the so called centering head 67 may be moved immediately over one of the centering notches 70 and onto the corresponding rail plate 71 and then, when the crank arm 74 is moved upward and, through the crank rod 72 and shaft 73, the engaged rail plate 71 is lowered, the centering head 67 will be dropped into the said notch 70 and, by this movement, the registers and their escapement dogs are simultaneously lowered and accurately positioned laterally as will more fully appear in the description of the operation.

*Register actuator or key restoring mechanism.*—For each column of register actuators or keys, there is a vertically disposed restoring blade 82, see Figs. 5, 6, 7, 8, 11 and 15, that extends through the body portion 22 of the said keys. At their upper and lower ends, the restoring blades 82 are provided with trunnions 83, that work in slots 84 of segmental cam bars 85, which latter are mounted for endwise circular movement, the one on the bearing plate 14 and the other on the bearing plate 17. There is, of course, an upper and lower cam bar 85 for each of the four sets of keys, and each pair has vertically alined notches 86 that are engaged by crank pins 87 of short cranks 88 secured to a vertical rock shaft 89 mounted in suitable bearings afforded by the plates 14 and 17. At its lower end, each of the four independently movable rock shafts 89 is provided with an operating lever 90, and below the respective bearing plates 14, they are provided with segmental ratchet wheels 91. Each ratchet wheel 91 is provided at one extremity with a lock shoulder 92 that is normally engaged by the hooked end of a spring pressed lock dog 93 shown as intermediately pivoted to a bearing 94 secured to the vertical portion of the bearing plate 14 and working through a slot therein.

Secured to the depending ends of one of the long register supporting bars 45, is a tripping cam 95, which when the registers are lowered by engagement of the centering head 67 with the centering notch 70, it engages the inner end of the alined lock dog 93 and forces the same into an inoperative position, so that the rock shaft 89 may then be freely oscillated, or moved from the position indicated by full lines in Fig. 15, toward the observer. This movement of the said rock shaft will slide the cam bars 85, and their oblique slots 84 acting on the trunnions 83 will simultaneously force all the restoring blades 82 of the particular set or section outward. Such outward movements of the restoring blade 82, will force all of the keys or register actuators radially outward from their set positions back to normal positions indicated in Fig. 11 and in various other views.

Each vertical rock shaft 89 is also provided, as shown, just below its ratchet wheel 91, with a segmental cam plate 96 having a raised cam flange 96ª, which when the rock shaft 89 is moved from its normal position, as above stated, engages the flanged bar 65 and, acting thereon, simultaneously raises the connected bars 45 far enough to carry the centering head 67 out of the centering notch 70. Simultaneously with this raising action, a cam flange 97ª of another segmental cam plate 97 which is secured to the upper end of the rock shaft 89, engages the stud 72ª and raises the corresponding rail plate 71 back to its normal position, and under which action the arm 74 of the crank shaft 73 will drop and again throw its crank and the rod 72 back into its locked position best shown in Figs. 13 and 14. It may be here also stated that preferably the arm 74 is provided at its free end with the weight 74ª, shown in Fig. 1 as in the form of a star.

The voting booths are preferably formed by segmental wings or curved sheet metal plates 98 that are hinged at 98ª to the projecting ends of the arms of the upper and lower brackets 4 and 5, see Figs. 1 and 2. Draw curtains 99 are shown as supported by rods 100 that are detachably applied to the opened wings 98. To indicate the position of the common set of registers, in respect to anyone of the several sets of keys or register actuators, the shaft 6, at its extreme upper end, is provided with the pointer 101 shown as connected thereto by small stem 102 and arranged to work over light metal cap 103, best shown in Figs. 2 and 6.

*Operation.*—Figs. 1 and 2 show the machine in condition for use. Normally, the lock dogs 93 operating on the shoulders 92 of the segmental ratchet wheels 91, hold the respective rock shafts 89 and operating levers 90 in the positions best shown in Fig. 15. Normally also, the track plates 71 are, by the crank shafts 73, held in their uppermost positions so that no matter where the registers and their escaping levers 47 may normally stand, the register actuating keys may be moved into set positions and back into normal positions, without action on any of the registers. This is because when the head 67 rides on top of the rail 68, or on top of a raised rail plate 71, the cam lugs 53 and 54 of the escapement levers 47 stand in positions above the line of movement of the cam portions 27 of the respective key bodies 22. Hence, if a voter after having pushed one of the keys into a set position, changes his mind, or has made a mistake, and wishes to vote for another party, he simply pulls back the incorrectly set key and pushes another key of the same group. When the registers are in their normal or raised positions, the lugs 50 on the escapement levers 47 are engaged by the upper extremities of the lock strips 52, and the registers are therefore then locked.

After the voter in any particular booth has pushed into set positions keys representing his entire vote, he moves the lever 74 which is located within that booth, into an upright position, thereby dropping the corresponding rail plate 71 below the coöperating centering notch 70, and at the same time the upward movement of the said lever throws the star 74ª above that particular booth, and this serves to indicate to the election judge or attendant, that he is ready to cast his vote. Then, by manipulation of the wheel 81, the election judge or attendant turns the common set of registers until the pointer 101 points at the raised star, and this movement serves to bring the centering head 67 into the centering notch 70 which belongs to the booth and to the set of register actuating keys which as just noted, have been set for the proper registration of one person's complete vote. When the said centering head drops into the centering notch 70, the supplemental register support with its registers and their escapement levers, are lowered slightly and are accurately so positioned that when the set keys are moved from their "set" positions back to their normal positions, their cam surfaces 27 engage first the cam lugs 54 and then the cam lugs 53 of the respective escapement levers 47 (see Fig. 11), and will thus impart complete upward and downward vibratory movements to the said levers 47. Under upward movements, the upper cam lugs of said levers operating on the pins of the operating wheels 46. impart half step of movement to the latter; and under downward movements, the lower cam lugs 46 impart the second half steps of movement to said wheels 46, and thus register one acts on each register thus acted upon.

It will be remembered that when the supplemental register support is moved downward as just above stated, the tripping cam 95 releases the lock dog 93 from the ratchet wheel 91. This being done, the operator effects the simultaneous return to normal positions of all of the set registers, by movement of the operating lever 90 in the direction of the arrow marked thereon in Fig. 15. The same movement of the said lever causes the cam flange 96ª to raise the supplemental register support and simultaneously therewith, causes the cam flange 97ª to raise the corresponding rail plate 71 back to its normal locked position, with the lever 74 dropped back into horizontal position; but these actions take place at the final part of the operative movement of the lever 90 and at the time after the keys have been moved far enough to cause the escapement levers 47 to operate the respective registers.

When the lever 90 is moved as just stated, to-wit. into the lower dotted line position indicated in Fig. 12, it will be locked into that position, by reëngagement of the lock dog 93 with the ratchet wheel 91, and before this section of the machine can be again used for voting purposes, the said lock dog must be held in an inoperative position while the lever 90 and the other parts carried thereby are returned to their normal positions. Various devices may be provided for accomplishing this release of the lock dog 93 from the ratchet wheel 91, but in Fig. 15, a long pin 104 is shown as provided for this purpose. This releasing pin will, of course, be kept by the election judge or machine attendant.

It will thus be seen that each of the several sets of register actuating keys, may by persons in different booths, at the same time, be independently set to represent their respective votes, and that whenever one of the parties is ready to cast his vote, the common set of registers can be moved into position for coöperation with that set of register actuating keys. The time required for the actual registration of the votes represented by the set keys of any particular section of the machine, is very short, and in fact, only requires a few seconds for the manipulation of the operating lever 90. Hence, the one set of registers will be found sufficient to take care of the registration of votes, preliminarily represented by the "set" keys of a great many different sections or complete sets of register actuating keys.

When the machine is out of use, the hinged wings 98 may be folded so as to form a cylindrical casing inclosing the projecting portions of the keys; and then the whole casing may be moved downward upon the supporting pedestal as shown in Fig. 3. This brings the entire machine within small space, so that it is in good condition for storage or shipment.

The construction illustrated in Fig. 23 is the same as that above described with this exception, that the several sets of register actuating keys and the booth forming wings 98 are in semi-cylindrical arrangement.

Within the scope of this invention, the several sets of register actuating keys may be arranged in a great many different ways, for instance, they might be arranged in a straight row, and the common set of registers in this instance would, of course, be arranged to travel on a straight line, for coöperation with the different sets of keys.

What I claim is:

1. In a multiplex voting machine, a common set of registers, several independent sets of register actuators for action on said common set of registers, and means for moving one of said class of elements bodily to thereby bring said common set of registers into coöperative relation in respect to any one of said sets of register actuators.

2. In a multiplex voting machine, the combination with a common set of registers and a traveling support for the same, of several independent sets of register actuators, the actuators in each set being equal in number to the registers in the said common set, and which common set of registers, by their traveling support, is movable into coöperative relation in respect to any one of the said independent sets of register actuators.

3. In a multiplex voting machine, the combination with several independent sets of register actuators, of a common set of registers movable into different positions to render the same subject to any one of the said independent sets of actuators the actuators in each set being equal in number to the registers in the said common set and which actuators in the several sets are arranged in multi-office and multi-party groups.

4. In a multiplex voting machine, the combination with several independent sets of register actuators, of a common set of registers, and a support for said registers capable of two movements, the one serving to approximately position and the other movement serving to completely position said registers, so that they will be subject to set register actuators of any one of the said independent sets the actuators in each set being equal in number to the registers in said common set and which actuators in the several sets are arranged in multi-office and multi-party groups.

5. In a multiplex voting machine, the combination with several independent sets of register actuators, of a common set of registers, a support for said registers, means for moving said register support, first, to bring the registers approximately in a position for co-action with the selected set of register actuators and then to move said registers completely to positions in which they will co-act with registers of the selected set.

6. In a multiplex voting machine, the combination with several independent sets of register actuators and independent vote limiting devices for each set of register actuators, of a common set of registers, and means for bringing said common set of registers into coöperative relation in respect to any one of said independent sets of register actuators.

7. In a multiplex voting machine, the combination with several independent sets of register actuators, coöperating independent vote limiting devices and independent coöperative actuator restoring devices for each set of actuators, of a common set of registers, a support for said registers and means for moving said support so as to bring said registers into coöperative relation in respect to any one of the said independent sets of register actuators.

8. In a multiplex voting machine, the combination with several independent sets of register actuators, of a register support, a common set of registers carried by said support, and means for moving said register support both vertically and horizontally to render the said register subject to set members of any one of said independent sets of register actuators.

9. In a multiplex voting machine, the combination with several independent sets of register actuators arranged in circumferentially spaced vertical columns, of an oscillatory register support, a common set of registers carried by said support and arranged in circumferentially spaced vertical columns, corresponding to any one of the independent sets of register actuators, and means for imparting both vertical and horizontal movement to said register support, to render said registers subject to set members of any one of the said independent sets of register actuators.

10. In a multiplex voting machine, the combination with several independent sets of register actuators, of a common set of registers, a support for said registers, means for moving said register support so as to approximately position said registers for coöperative action in respect to any one of the said independent sets of registers, whereby the said register actuators may be moved into set positions and back to normal positions, individually and without action on the said registers, means for imparting a second movement to said register support, thereby completely positioning the said registers subject to said register actuators, and means for subsequently restoring the set register actuators to normal positions and rendering the same operative on the coöperating registers, under such return movement.

11. In a multiplex voting machine, the combination with several independent sets of register actuators, of a common set of registers movable into different positions for coöperation with any one of said independent sets of register actuators, the said register actuators being capable of movement into set positions and back to normal positions, individually and without action on the coöperatively positioned sets of registers, and restoring devices for said independent series of register actuators, rendering the same operative on the coöperating registers under return movement.

12. In a multiplex voting machine, the combination with circumferentially spaced register actuators arranged in several independent sets, of a common set of registers circumferentially spaced and contained within the quadrant of an imaginary cylinder and arranged to be moved pivotally into position for co-action in respect to any one of the said independent sets of register actuators.

13. In a multiplex voting machine, the combination with several independent sets of register actuators arranged in circumferentially spaced vertical columns, of a common set of registers arranged in circumferentially spaced vertical columns corresponding to the arrangement of any one of the independent sets of register actuators, a segmental support for said registers, pivotally mounted and movable to bring said common sets of registers into coöperative relation in respect to any one of the said independent sets of registers.

14. In a multiplex voting machine, the combination with several independent sets of register actuators arranged in circumferentially spaced vertical columns and for radial movement, of independent vote limiting mechanism and independent actuator restoring mechanism for each set of actuators, a common set of registers in circumferentially spaced vertical columns arranged to correspond to any one set of register actuators, and a rotary support for said registers movable to bring the said registers into coöperative relation in respect to any one of the said sets of actuators.

15. In a multiplex voting machine, the combination with several independent sets of register actuators arranged in circumferentially spaced vertical columns completely surrounding a common axis, of a register support rotatively mounted on said common axis, and a common set of registers carried by said support and movable thereby into coöperative relation in respect to any one of the said several independent sets of register actuators.

16. In a multiplex voting machine, the combination with a skeleton cylindrical actuator supporting frame having several hinged sections, of independent sets of register actuators mounted on said hinged frame section, a register support rotatively mounted at the axis of said cylindrical support, and a common set of registers carried by said register support and movable thereby into coöperative relation in respect to any one of said independent sets of register actuators.

17. In a multiplex voting machine, an actuator support having independent and movable sections, an independent set of register actuators on each frame section, a traveling register support, and a common set of registers carried by said traveling support and movable thereby into coöperative relation in respect to any one of said independent sets of register actuators.

18. In a multiplex voting machine, the combination with several independent sets of register actuators, coöperating vote limiting mechanism and actuator restoring mechanism, of a common set of registers movable into coöperative relation with respect to any one of said sets of independent actuators and which actuators are movable into set positions and back to normal positions without action on coöperating registers, and means for rendering the set register actuators operative on corresponding registers.

19. In a multiplex voting machine, the combination with several independent sets of register actuators, of a common set of registers movable into different positions for coöperation with any one of the said independent sets of actuators, normally locked means for rendering the set actuators operative on corresponding registers, and a device for releasing said normally locked means.

20. In a multiplex voting machine, the combination with several independent sets of register actuators, of a common set of registers movable into different positions for coöperation with any one of said sets of actuators, which actuators are normally movable to and from set positions, without action on corresponding registers, normally locked means for rendering the set actuators operative on corresponding registers, and a device for releasing said normally locked means.

21. In a multiplex voting machine, the combination with several independent sets of register actuators, of a common set of registers movable into different positions for coöperation with any one of said independent sets of register actuators, normally locked means for rendering the set actuators operative on corresponding registers, a device for releasing said means, and means for again throwing said registers out of coöperative relation in respect to the several independent sets of register actuators.

22. In a multiplex voting machine, the combination with several sets of register actuators, of a track extending along said register actuators and provided with a notch or depression for each set of register actuators, a common set of registers and a support for said registers provided with a head or shoe arranged to run on said track and to engage the said centering notches thereof to set said registers in coöperative relation in respect to any one of said independent sets of register actuators.

23. In a multiplex voting machine, the combination with several sets of register actuators, of a track extending along said register actuators and provided with a centering notch for each independent set thereof, supplemental track sections normally completing the track at said centering notches, but independently movable to open the said notches, a common set of registers, and a register support provided with a head or shoe movable on said track and engageable with said notches to position said registers for coöperation with any one of said independent sets of register actuators.

24. In a voting machine, the combination with a column of registers and a column of register actuators, of an upright laterally movable barrel for supporting the registers and a register lock bar operative, when the registers are in normal position, to lock the same.

25. In a voting machine, the combination with a column of registers and coöperating register actuators and escapement dogs for operating said registers under the action of said actuators, of means normally holding said bar raised and the said escapement dogs out of the range of action of said actuators, and a lock bar operative on said escapement dogs to lock said registers when the said bar is raised.

26. In a multiplex voting machine, the combination with a common set of registers and a movable support for the same, of several independent sets of register actuators, the actuators in each set being equal in number to the registers in the said common set, and which register support is movable in either of two opposite directions, to render said common set of registers subject to any one of said several independent sets of register actuators.

27. In a multiplex voting machine, the combination with several independent sets of register actuators, of a common set of registers, and means for moving one of said class of elements bodily, to thereby bring said common set of registers into coöperative relation in respect to any one of said independent sets of register actuators, and vote limiting mechanism coöperating with each set of actuators.

28. In a multiplex voting machine, the combination with several independent sets of register actuators, of a common set of registers, and means for moving one of said class of elements bodily, to thereby bring said common set of registers into coöperative relation in respect to any one of said independent sets of register actuators, and vote limiting mechanism coöperating independently with each set of actuators and dividing said actuators into sets arranged in multi-office and multi-party groups.

In testimony whereof I affix my signature in presence of two witnesses.

SYVER LOE.

Witnesses:
H. D. KILGORE,
F. D. MERCHANT.